May 11, 1926.
A. S. FISHEL
1,584,361
BRAKE SUPPORTING AND OPERATING MECHANISM
Filed Dec. 5, 1923  2 Sheets-Sheet 1
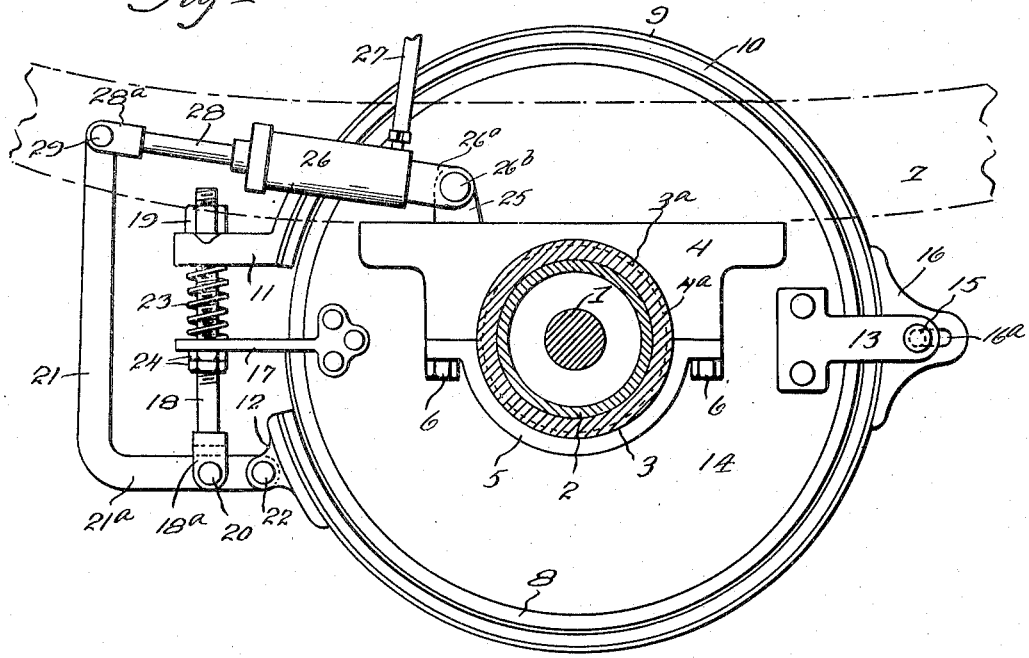
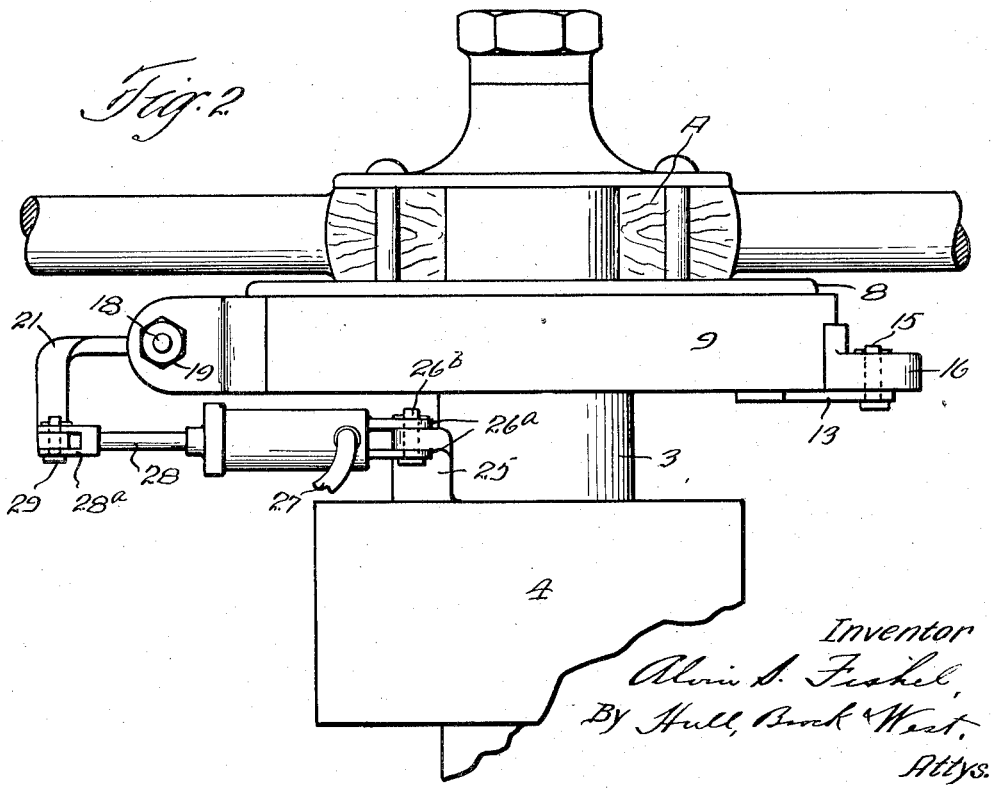
Inventor
Alvin S. Fishel,
By Hull, Buck & West,
Attys.

May 11, 1926.
A. S. FISHEL
BRAKE SUPPORTING AND OPERATING MECHANISM
Filed Dec. 5, 1923  2 Sheets-Sheet 2
1,584,361
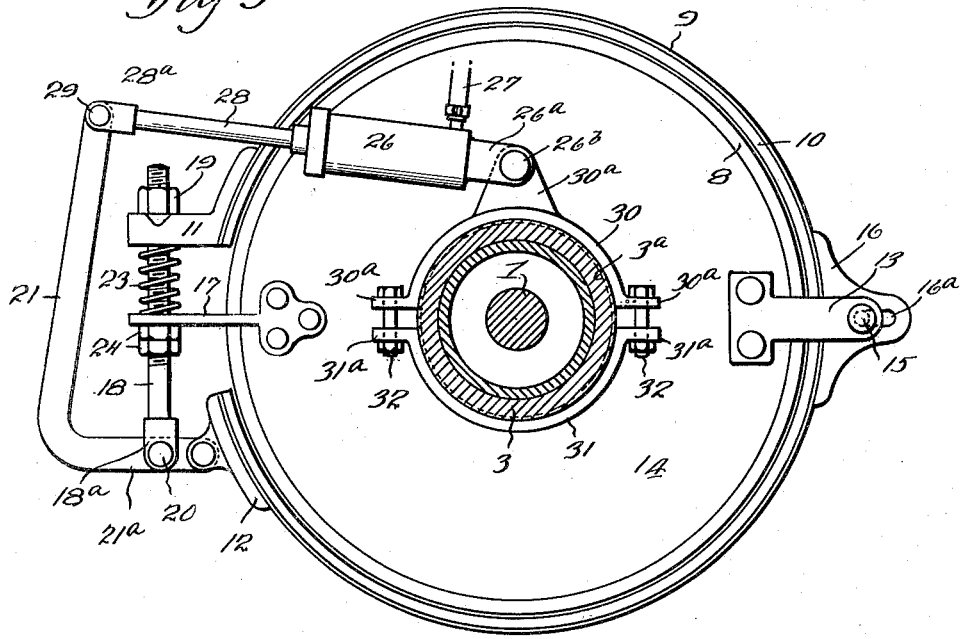
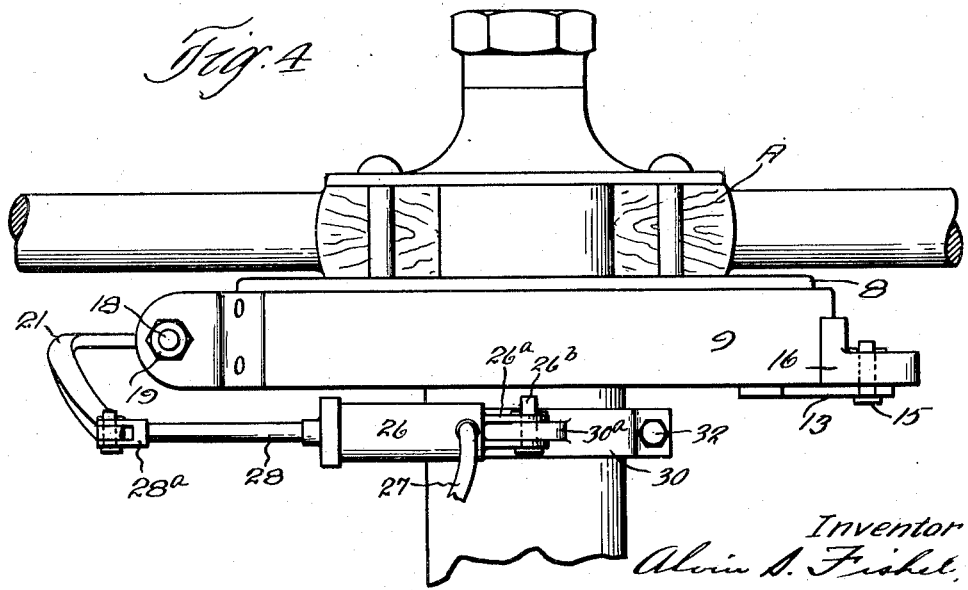
Inventor
Alvin S. Fishel,
By Hull, Brock & West,
Attys.

Patented May 11, 1926.

1,584,361

UNITED STATES PATENT OFFICE.

ALVIN S. FISHEL, OF CLEVELAND, OHIO.

BRAKE SUPPORTING AND OPERATING MECHANISM.

Application filed December 5, 1923. Serial No. 678,667.

The invention relates to brakes for automobiles or similar vehicles and more particularly to brakes of the type which are adapted to be operated by fluid under pressure, the operating fluid which I prefer at the present for such purpose being oil or similar liquid.

It is the general purpose and object of the invention to provide means whereby brake-operating cylinders may be conveniently and efficiently supported; also to provide means for supporting the brakes and for operating the same from such cylinders in a like efficient manner. The foregoing objects will be accomplished in and through the combinations of elements embodied in the claim hereto annexed and will be realized through the construction and arrangement of parts shown in the drawings, wherein Fig. 1 represents a sectional side elevation of a brake drum, together with my brake operating mechanism, the same being shown as applied to the rear or driving wheel of an automobile; Fig. 2 a plan view of the parts shown in Fig. 1, the wheel hub A being shown in section; and Figs. 3 and 4 are views, similar to Figs. 1 and 2, respectively, showing a modification of my invention.

Describing the various parts by reference characters, and with particular attention to Figs. 1 and 2, 1 denotes the rear or driving axle of an automobile, 2 the housing, and 3 a sleeve surrounding the outer portion of the housing and having a recessed annular seat 3ª on which is mounted the spring seat 4. This seat is provided with a semi-cylindrical recess 4ª therein adapted to be fitted on the upper portion of the seat 3ª, and is secured to the sleeve 3 by means of a lower semi-cylindrical clamping member 5 and bolts 6. When the bolts 6 are set up, the spring seat will preferably have a rocking movement on the axle 2, to accommodate the deflections of the spring, indicated in dot-and-dash lines at 7.

8 denotes a brake drum, secured to the wheel hub A, 9 the brake band, and 10 the brake-band lining. The brake band is provided with the upper bracket 11 and the lower bracket 12 and is movably supported at a point approximately equidistant from these brackets by means of an anchoring arm 13 carried by the cover plate 14, the outer end of the arm being connected to such portion of the brake band by means of a pin 15 entering the slot 16ª of a bracket 16 secured to such band.

Projecting from the opposite side of the plate 14 is a brake-band supporting arm 17 having an opening in the outer end thereof for the passage of the adjusting bolt 18. This bolt is provided with a nut 19 at its upper end which is pivoted upon the bracket 11, the lower end of the bolt being provided with a clevis 18ª by means of which and a pin 20 it is connected to the inwardly directly arm 21ª of an angular brake band lever 21, the lower end of which is pivotally connected to the bracket 12 by means of a pin 22. A spring 23 is interposed between the bracket 11 and arm 17, surrounding the bolt 18; and the said bolt is provided with the adjusting and lock nuts 24 below said arm.

Projecting upwardly from the spring seat 4 is a lug 25. A cylinder 26 is pivoted to said lug by the clevis 26ª and is provided with a hose or pipe 27 for supplying oil or other operating fluid thereto.

Projecting from the cylinder 26 is the piston rod 28 having a clevis 28ª by means of which and a pin 29 it is pivotally connected to the upper end of the lever 21.

With the parts constructed and arranged as described, the operation will be readily understood. When fluid under pressure is supplied to the cylinder 26 through the hose or pipe 27, the piston and the rod 28 are moved to the left, thereby rocking the lever 21 about the pin 20 as a center and applying the lower section of the brake to the drum. Further movement of the said piston rod causes the lever 21 to pivot about the pin 22, pulling downward upon the bolt 18 and applying the upper section of the brake to the drum. Further movement of the piston rod causes both the upper and lower sections of the brake to engage the drum.

In Figs. 3 and 4 of the drawing, the construction is identical with that shown in the preceding views except that the clevis 26ª of the cylinder 26 is pivotally connected by the pin 26ᵇ with a lug 30ª projecting upwardly from the upper member 30 of a clamp, the lower cooperating member of which clamp is indicated at 31. These two clamping members are approximately semi-cylindrical in shape, but their joint diameter (when the lugs 30ª and 31ª thereof are in contact) is less than the external diameter of the cylindrical seat 3ᵃ. This enables the clamp to be secured non-rotatably to the seat 3ᵃ by means of the bolts 32, extending through the flanges of the seat sections or members.

In all other respects, the parts shown in Figs. 3 and 4 are identical with those shown in Figs. 1 and 2 and are designated by the same reference characters; and the manner in which the brake band is applied to the drum by the piston rod 28 is also identical with the manner in which the piston rod operates the brake band in the form of my invention shown in Figs. 1 and 2.

By reason of the construction and arrangement of the parts shown in the drawings, the brake-operating cylinder is mounted in a convenient and efficient manner and without any material change in or addition to existing equipment. Furthermore, the construction shown will enable the brakes to be operated in an efficient maner.

Having thus described my invention, what I claim is:—

The combination, with an axle and a housing surrounding the same, of a brake drum, a brake band cooperating with said drum, a two part clamp fastened to and surrounding said housing, a cylinder pivotally mounted on said clamp, a piston rod extending from said cylinder, an angular lever connected at one end to said piston rod and at the opposite end to an end of said brake band, and a connection from the opposite end of said brake band and a point on said lever intermediate its ends.

In testimony whereof, I hereunto affix my signature.

ALVIN S. FISHEL.